UNITED STATES PATENT OFFICE.

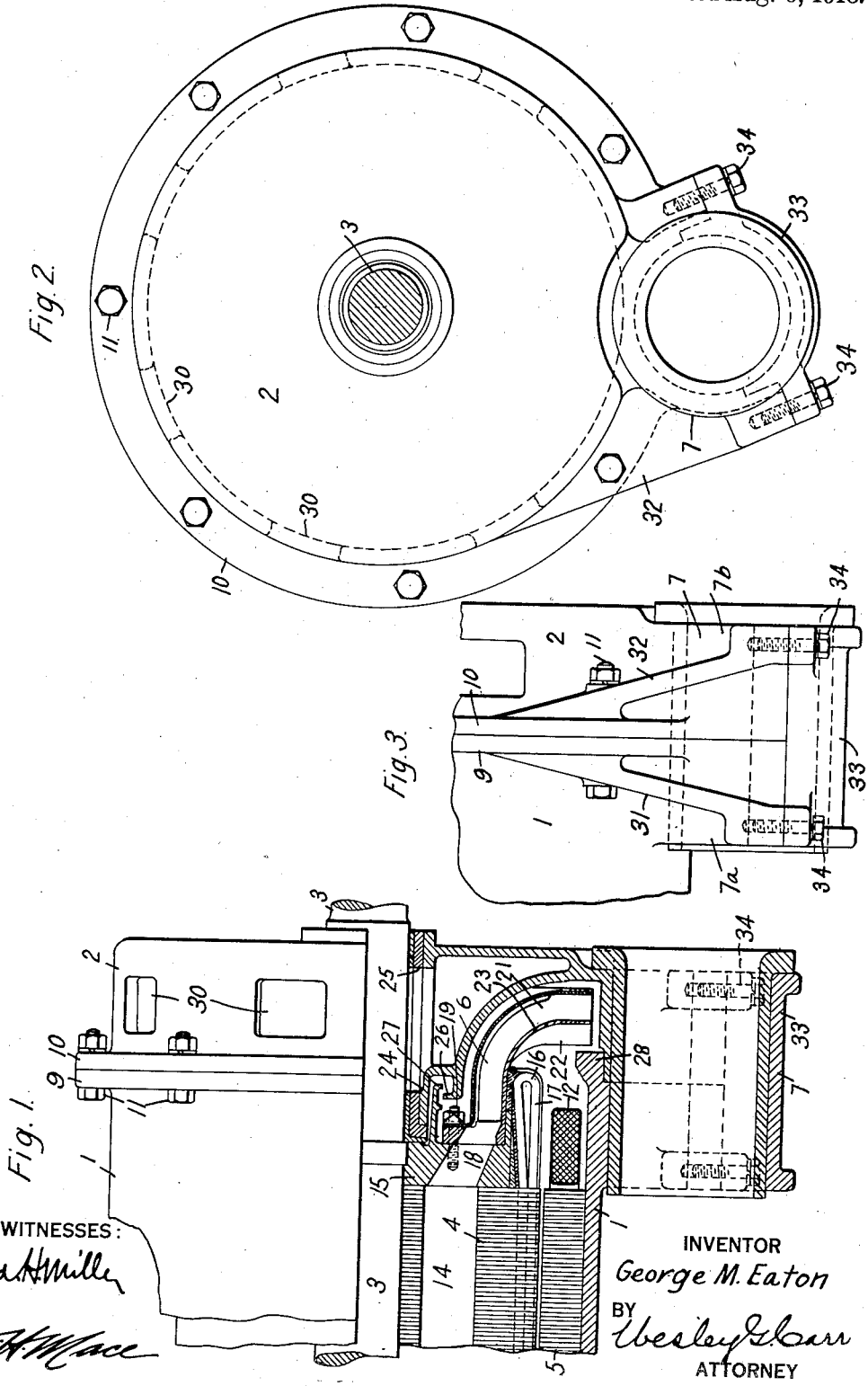

GEORGE M. EATON, OF PITTSBURGH, PENNSYLVANIA, ASSIGNOR TO WESTINGHOUSE ELECTRIC AND MANUFACTURING COMPANY, A CORPORATION OF PENNSYLVANIA.

DYNAMO-ELECTRIC MACHINE.

1,275,003.

Specification of Letters Patent.

Patented Aug. 6, 1918.

Application filed August 9, 1915. Serial No. 44,451.

*To all whom it may concern:*

Be it known that I, GEORGE M. EATON, a citizen of the United States, and a resident of Pittsburgh, in the county of Allegheny and State of Pennsylvania, have invented a new and useful Improvement in Dynamo-Electric Machines, of which the following is a specification.

My invention relates to dynamo-electric machines, and it has special reference to railway motors of the ventilated type.

One of the objects of my invention is to provide a machine of the above-indicated character which shall be simple, compact and durable in construction, and which shall, by reason of its peculiar arrangement of parts, be adapted to accommodate a fan of relatively large diameter, whereby greater economies from ventilation may be realized.

Another object of my invention is to provide a ventilated motor having a fan of maximum diameter with respect to the frame which shall be adapted to deliver air outwardly in a radial direction through openings in the bearing-housing brackets.

A further object of my invention is to provide a motor frame having detachable end bearing-housing brackets secured thereto, and multi-part axle brackets, the halves of which are integrally associated with the frame and with the housing brackets and which register, the one with the other, to receive the axle brasses, the axle caps being separately bolted to the independent and complementary axle-bracket parts.

The effectiveness and efficiency of a ventilated motor depends, to a large extent, upon the diameter of its fan, and, in motors as heretofore constructed, it has been impossible to utilize a fan of substantially the diameter of the frame by reason of the obstructions offered by the armature and field coils.

According to my invention, however, I provide a fan which is secured to one end of the armature and projects longitudinally and outwardly beyond the ends of the motor frame and is inclosed by bearing-housing brackets having peripheral openings through which the air is discharged in a radial direction from the fan.

My invention may best be understood by reference to the accompanying drawing in which Figure 1 is a view, partially in section and partially in side elevation, of a portion of a motor constructed in accordance with my invention; Fig. 2 is an end elevation of the motor shown in Fig. 1, and Fig. 3 is an enlarged view, in side elevation, of a portion of the motor, illustrating the bearing-bracket construction.

In the drawing, the apparatus shown comprises a motor frame 1, a bearing-housing bracket 2, a shaft 3 rotatably mounted in said bracket, an armature 4, a field-magnet structure 5, a fan 6 and an axle bracket 7.

The motor frame 1 may be of cylindrical form and of either the split or box type, as desired, and is provided with end flanges 9 to which the bearing-housing brackets 2 are secured by means of their integral flanges 10 through the agency of bolts 11. The frame 1 embodies a field-magnet structure 5 of the usual polar type, the several polar projections of which are provided with field-magnet windings 12.

The armature 4, preferably of laminated construction, is secured to the shaft 3 and is provided with longitudinal ventilating ducts 14. On the ends of the laminated core 4 are end members 15 (only one of which is shown) which serve to secure the laminations in place and to support the end turns 16 of a plurality of armature conductors 17 that are disposed in slots, in accordance with usual practice. The end member 15 on the rear end of the motor, moreover, is provided with openings 18 which communicate with the armature ducts 14 and with the fan 6.

The fan 6 is secured by bolts 19, or other suitable means, to the end of the rear armature end member 15 and is curved in section in a longitudinal and a radial direction, whereby the peripheral end of the fan projects beyond the end of the motor frame 1 and is well removed from the armature conductors and field windings. Moreover, the configuration of the fan 6 and its location with respect to the motor windings makes it possible to secure the benefit of a diameter which is substantially equal to the inside of the motor frame and provides a passageway for the ventilating air currents which will offer a minimum of resistance to the flow of air therethrough.

The fan 6 is of double construction, one set of fan blades 21 serving to deliver air from the armature ducts 14, while another set of blades 22, that is separated from the first set by an annular partition 23, is adapted to produce a circulation of air through the air gap and through the space between the armature and the field magnet structure and its associated field windings.

The bearing-housing bracket 2 for the rear end of the motor embodies a bearing member 24 to receive bearing brasses 25 in accordance with the usual construction, an oil collector 26 being formed integral therewith. The end member 15 is provided with an oil thrower 27. The rear bearing-housing bracket 2 fits over a flange 28 on the end of the motor frame 1 and extends in a longitudinal direction beyond the end of the frame in such manner as to inclose the fan 6. Moreover, the bearing-housing bracket 2 is provided with a plurality of peripheral openings 30 which are located in substantially the plane of the fan and adjacent to the periphery thereof, whereby the fan delivers air directly through said openings in a radial direction.

In order to mount the motor upon an axle (not shown), a multi-part axle bracket 7 is provided, one part 7$^a$ of the bracket being formed integrally with the motor frame 1 and the other part 7$^b$ constituting an integral portion of the bearing-housing bracket 2. Rigidity and strength are secured by means of ribs or webs 31 and 32 which are associated, respectively, with the motor frame 1 and its axle-bracket portion 7$^a$ and with the bearing-housing bracket 2 and its corresponding axle bracket portion 7$^b$. Coöperating with the component parts of the axle bracket 7 is an axle cap 33 which is secured to the respective parts 7$^a$ and 7$^b$ by means of bolts 34.

Although I have shown and described a specific form of my invention, it is to be understood that my invention, in its broadest aspect, is not restricted to what is set forth, and, in the appended claims, I aim to cover all modifications which do not depart from the spirit and scope thereof.

I claim as my invention:

1. In a dynamo-electric machine, the combination with a frame and an armature disposed within said frame and provided with longitudinal ducts, of a housing secured to and forming an annular compartment adjacent the end of said frame and having a row of ventilating openings in its wall, and fan blades secured to said armature adjacent said ducts and extending axially and radially from the armature into said compartment.

2. In a dynamo-electric machine, the combination with a motor frame, an armature disposed therein and provided with longitudinal ducts, and a double fan secured to the end of the armature and having its outer end located beyond the motor frame and adapted to create independent currents of air through said armature ducts and the space between the armature and frame, of a detachable end bearing-housing bracket secured to the end of the motor frame and having peripheral openings in the plane of the outer end of the fan.

3. In a dynamo-electric machine, the combination with a frame having an integral axle-bracket part adjacent to one end thereof, an armature disposed in said frame and having longitudinal ducts therein, and a fan secured to one end of the armature and projecting longitudinally and outwardly beyond the end of said frame, of a bearing-housing bracket secured to the end of said frame and having an axle bracket part registering with the axle-bracket part of said frame, and provided with peripheral openings in the plane of the outer end of the fan, and an axle cap secured to both of said axle-bracket parts.

4. In a dynamo-electric machine, the combination with a frame having an integral axle-bracket part and a bearing-housing secured to the end of the frame and having an integral axle-bracket part adapted to register and coöperate with the bracket-part of said frame, of an axle cap coöperating with said bracket parts and secured to both of said component parts.

5. In a dynamo-electric machine, the combination with a frame having polar projections and field coils disposed thereon, an armature having longitudinal ducts, and a double fan secured to one end of said armature and projecting longitudinally and outwardly beyond the end of said frame and adapted to produce independent currents of air through said armature ducts and through the spaces between the frame and armature, of a detachable bearing-housing secured to the end of said motor frame and having peripheral openings therein in the plane of the fan through which the air currents are discharged radially from said fan.

6. In a dynamo-electric machine, the combination with a frame, an armature disposed therein and having a plurality of longitudinal ventilating ducts, a double fan secured to the end of said armature and adapted to produce independent currents of air through said armature ducts and through the frame, the fan being curved outwardly beyond the end of the motor frame, of a bearing-housing secured to the end of said frame and projecting longitudinally beyond it and provided with peripheral openings in the plane of the fan, a multi-part axle bracket comprising parts that are respectively integrally associated with said frame and said bearing-housing, and an axle cap coöperating with said bracket and secured to both parts thereof.

7. In a dynamo-electric machine, the combination with a frame, an armature disposed therein, and a housing secured to said frame, of an axle bracket having a part integral with said frame and a part integral with said housing, an axle cap, and means for securing the cap to said bracket.

8. In a dynamo-electric machine, the combination with a frame, an armature disposed therein, and a housing associated with the end of said frame, of an axle bracket constituting an integral part of the housing, an axle cap coöperating therewith, and a bolt for securing said cap directly to said housing bracket.

9. In a dynamo-electric machine, the combination with a frame, and an armature having longitudinal ducts, of a double fan secured to one end of said armature and adapted to produce independent currents of air through said armature ducts and through the space between the frame and armature, said air currents being discharged radially from said fan.

10. In a dynamo-electric machine, the combination with a frame member, of an armature disposed therein, a housing member secured to the end of the frame and having a bearing for the end of the armature shaft, said housing forming a compartment adjacent the end of the armature, and said housing and frame having interfitting annular oil-collecting portions adjacent said shaft, and a fan in said compartment having one end secured to said armature and the other end disposed radially with respect to the armature axis.

11. In a dynamo-electric machine, the combination with a frame having a radially-extending rim portion, an axle bracket part integral with said frame, and a bearing housing having a radially-extending rim portion that is adapted to be secured to said frame rim portion, of an axle bracket part integral with said housing, and a rib extending from each of said rim portions to opposite edges of said bracket parts.

12. In a dynamo-electric machine, the combination with a frame, an armature positioned within said frame and provided with a ventilating duct, and a bearing housing secured to said frame, of a fan secured to one end of said armature and adapted to deliver air radially outward through said bearing housing, and means for inclosing portions of said blades to provide a curved passageway from said duct through said fan.

13. In a dynamo-electric machine, the combination with a motor frame, and an armature disposed within said frame and provided with a longitudinal duct, of a thin-walled member extending laterally and outwardly from said armature, said member forming a curved passageway from said longitudinal duct terminating in a radial duct, and fan blades mounted in said passageway.

14. In a dynamo-electric machine, the combination with a motor frame, and an armature having a longitudinal duct, and fan blades adapted to cause a flow of air through said duct, a portion of said fan blades adapted to cause an independent flow of air through the space between the armature and the frame, of means inclosing a portion of said fan blades and forming a smooth-walled passageway from said duct to said fan.

In testimony whereof, I have hereunto subscribed my name this 28th day of July, 1915.

GEORGE M. EATON.